(12) United States Patent
Morifuji et al.

(10) Patent No.: US 9,779,539 B2
(45) Date of Patent: Oct. 3, 2017

(54) IMAGE PROCESSING APPARATUS AND IMAGE PROCESSING METHOD

(75) Inventors: Takafumi Morifuji, Tokyo (JP); Masami Ogata, Tokyo (JP); Yoshiki Okamoto, Tokyo (JP); Masaaki Hara, Tokyo (JP)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 14/003,307

(22) PCT Filed: Mar. 21, 2012

(86) PCT No.: PCT/JP2012/001960
§ 371 (c)(1),
(2), (4) Date: Sep. 5, 2013

(87) PCT Pub. No.: WO2012/132333
PCT Pub. Date: Oct. 4, 2012

(65) Prior Publication Data
US 2013/0342530 A1    Dec. 26, 2013

(30) Foreign Application Priority Data

Mar. 28, 2011    (JP) .............................. P2011-069311

(51) Int. Cl.
*G06T 15/20* (2011.01)
*H04N 13/02* (2006.01)

(52) U.S. Cl.
CPC ......... *G06T 15/205* (2013.01); *H04N 13/026* (2013.01)

(58) Field of Classification Search
CPC .......... G06T 19/00; G06T 17/00; G06T 17/20

USPC .................................................. 345/419, 629
See application file for complete search history.

(56) References Cited

U.S. PATENT DOCUMENTS

| | | | |
|---|---|---|---|
| 6,191,809 B1 * | 2/2001 | Hori et al. ...................... 348/45 |
| 6,677,939 B2 * | 1/2004 | Uchiyama .......... H04N 13/0404 345/419 |
| 7,197,193 B2 * | 3/2007 | Li et al. ........................ 382/285 |
| 7,446,733 B1 * | 11/2008 | Hirimai .......................... 345/32 |
| 8,000,521 B2 * | 8/2011 | Kira .............................. 382/154 |
| 8,780,256 B2 * | 7/2014 | Lipton et al. ................. 348/340 |

(Continued)

FOREIGN PATENT DOCUMENTS

| | | |
|---|---|---|
| CN | 1462416 A | 12/2003 |
| EP | 1598688 | 11/2005 |

(Continued)

OTHER PUBLICATIONS

Jul. 29, 2014, European Office Action for related EP Application No. 12713386.6.

(Continued)

*Primary Examiner* — Kimbinh T Nguyen
(74) *Attorney, Agent, or Firm* — Paratus Law Group, PLLC

(57) ABSTRACT

An information processing apparatus and method provide logic for processing information. In one implementation, a computer-implemented method includes receiving spatial positions associated with a plurality of images. The method determines displacements of the images in opposing first and second horizontal directions, based on at least the spatial positions. The method then generates, using a processor, first and second composites of the images, based on the determined displacements.

20 Claims, 8 Drawing Sheets

(56) References Cited

U.S. PATENT DOCUMENTS

| | | | |
|---|---|---|---|
| 2002/0118275 A1 | 8/2002 | Harman | |
| 2007/0052794 A1* | 3/2007 | Ha et al. | 348/42 |
| 2009/0040295 A1* | 2/2009 | Koo et al. | 348/42 |
| 2010/0021141 A1 | 1/2010 | Yamashita et al. | |
| 2011/0050864 A1* | 3/2011 | Bond | 348/51 |
| 2011/0229014 A1* | 9/2011 | Knee et al. | 382/154 |
| 2012/0176370 A1* | 7/2012 | Imai | H04N 13/0456 345/419 |

FOREIGN PATENT DOCUMENTS

| | | |
|---|---|---|
| JP | 11-155861 | 6/1999 |
| JP | 2001-320731 | 11/2001 |
| JP | 2004-505394 | 2/2004 |
| JP | 2005-006114 | 1/2005 |
| WO | WO96/41311 | 12/1996 |
| WO | WO02/13143 | 2/2002 |
| WO | WO2005/057496 | 6/2005 |

OTHER PUBLICATIONS

Apr. 8, 2015, CN communication issued for related CN Application No. 201280014191.6.

Jun. 30, 2015, JP communication issued for related JP application No. 2011-069311.

Dec. 22, 2015, Japanese Office Action for related JP Application No. 2011-069311.

* cited by examiner

[Fig. 1]
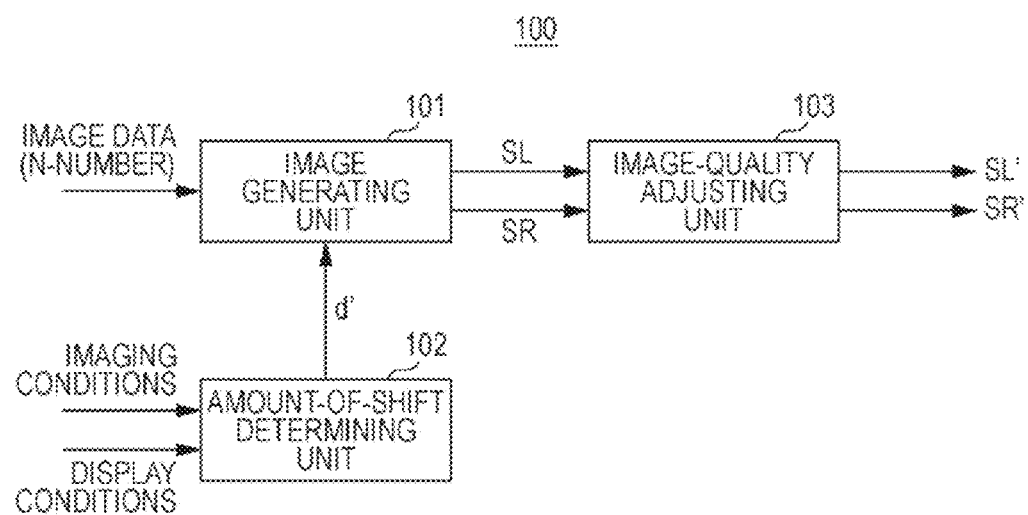

[Fig. 2]
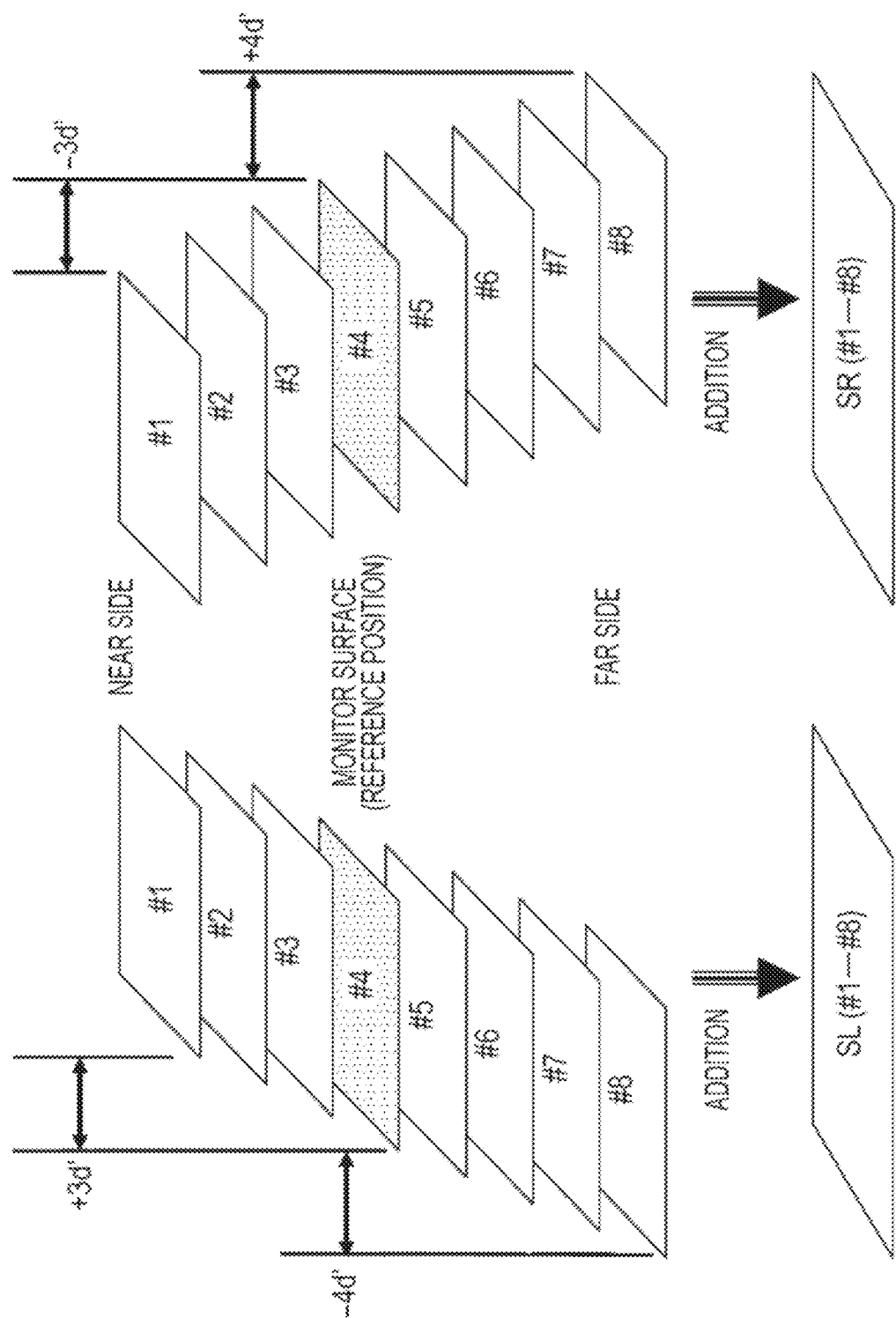

[Fig. 3]
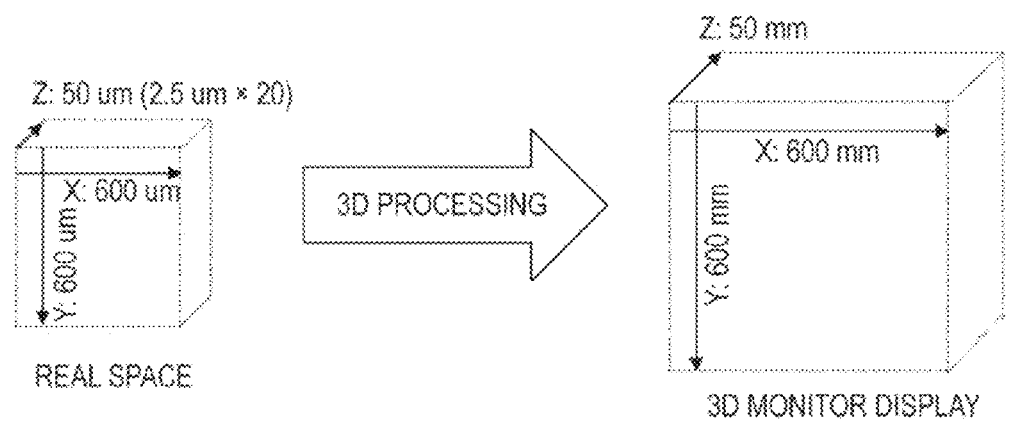
[Fig. 4]
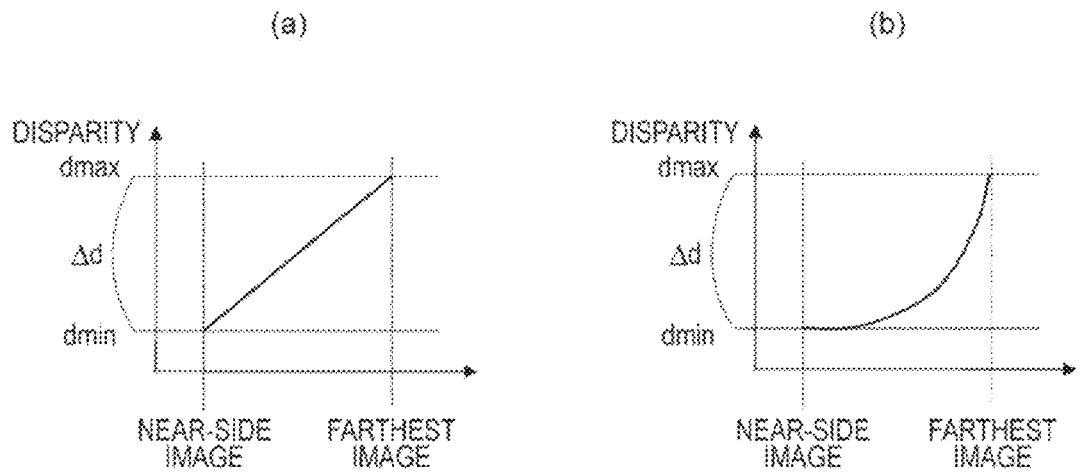

[Fig. 5]
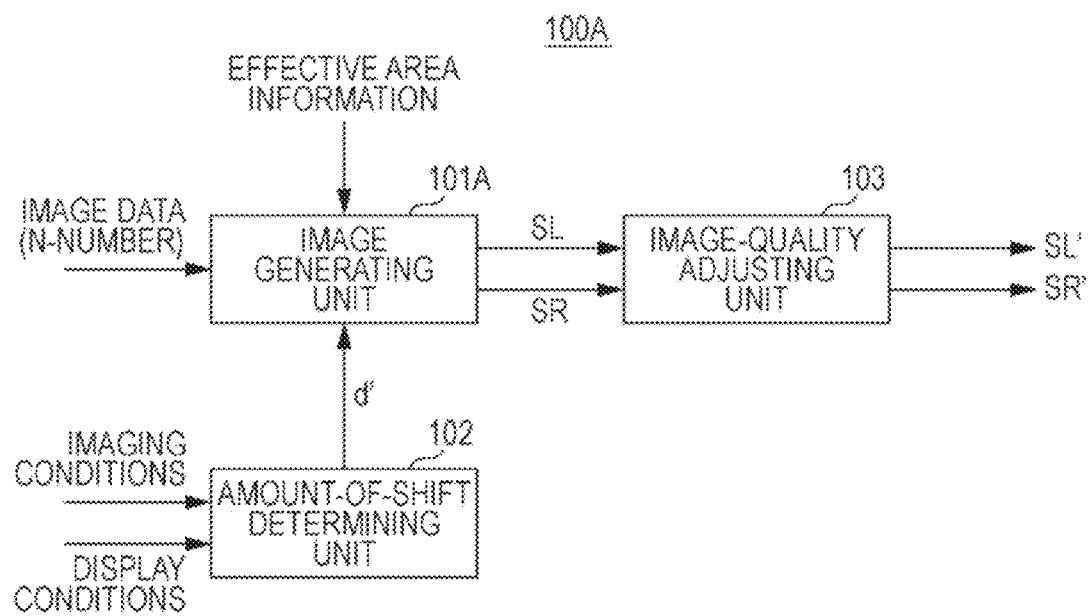

[Fig. 6]
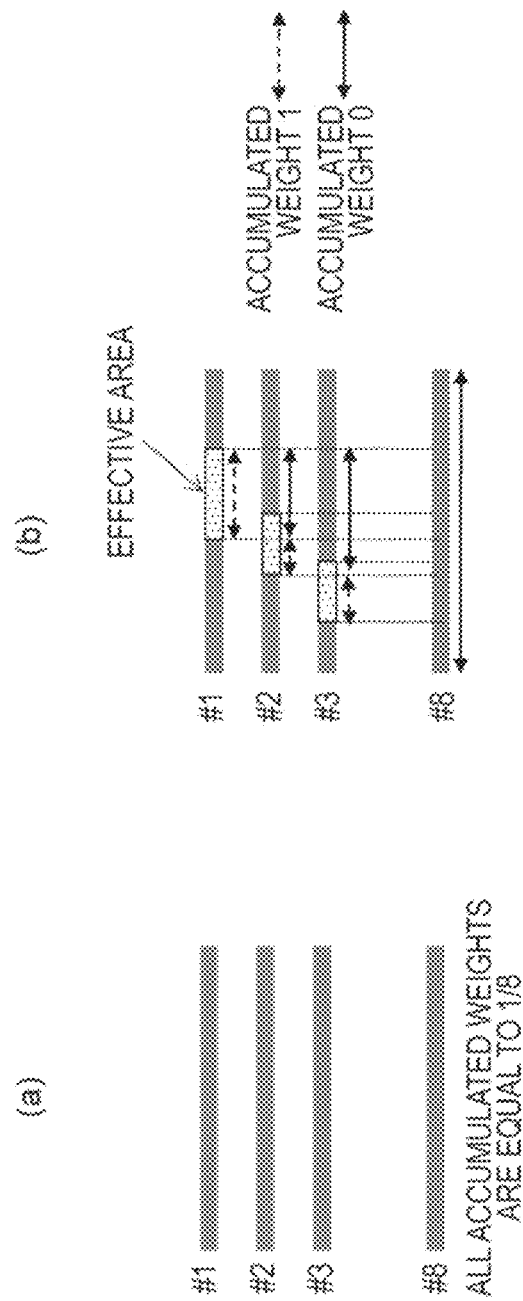

[Fig. 7]
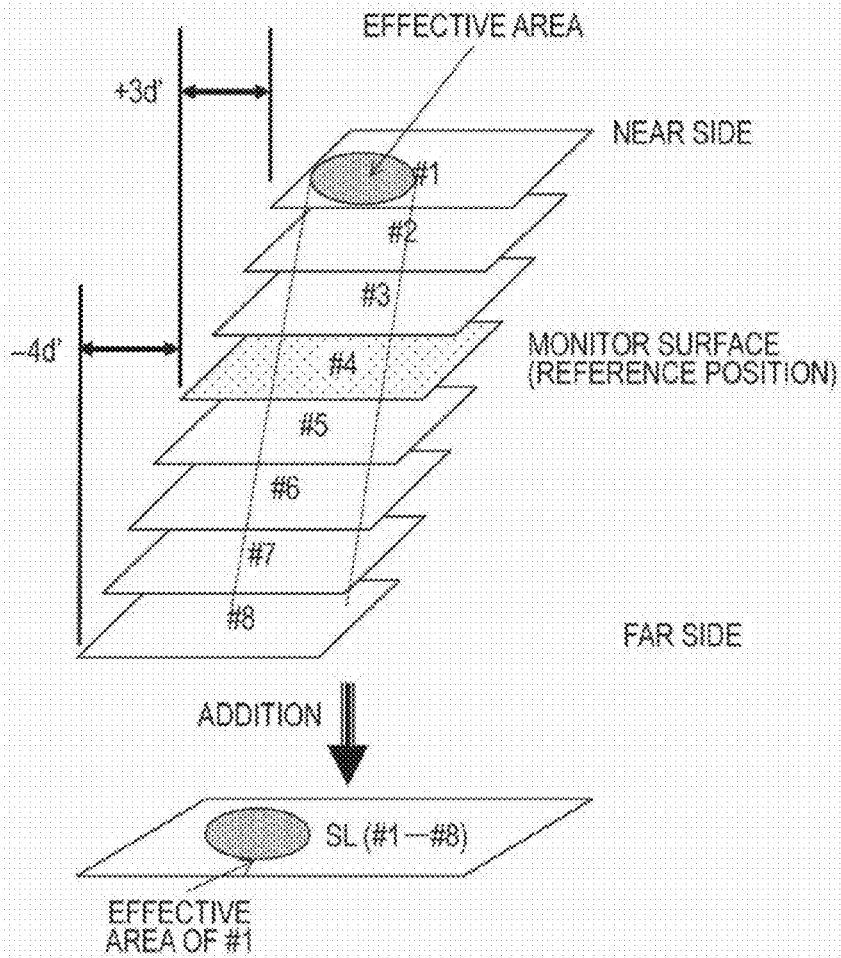
[Fig. 8]
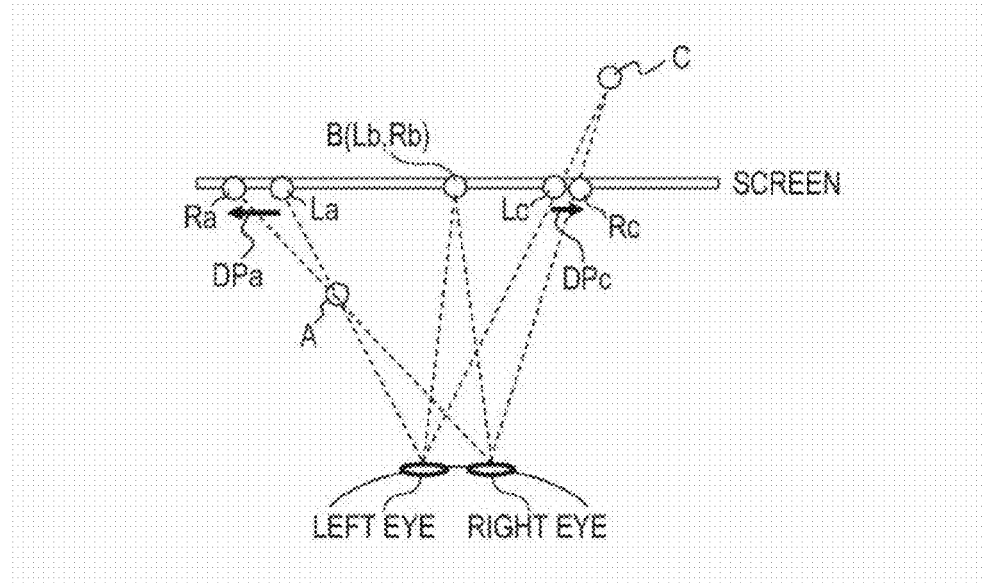

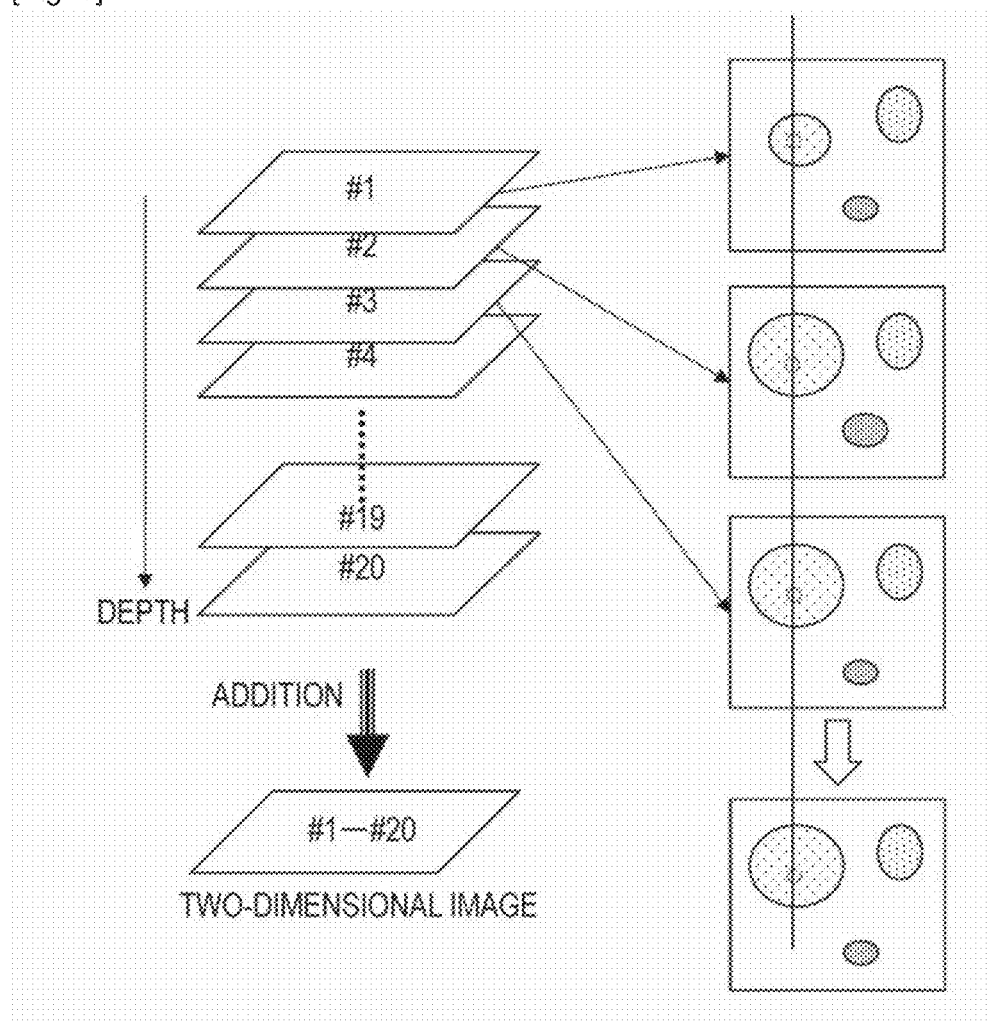

[Fig. 10]
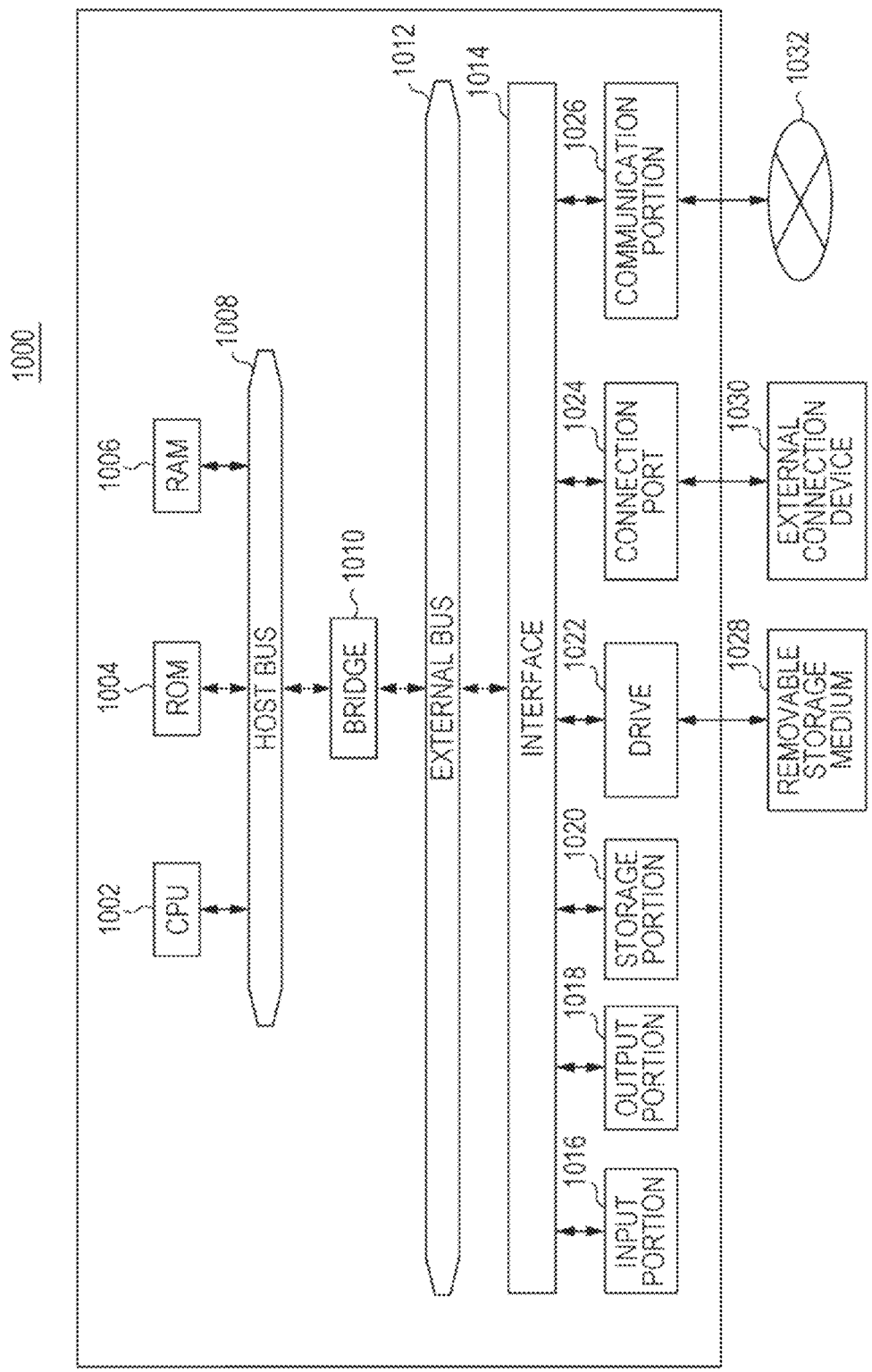

IMAGE PROCESSING APPARATUS AND IMAGE PROCESSING METHOD

TECHNICAL FIELD

This application is a National Stage Patent Application of PCT International Patent Application No. PCT/JP2012/001960 (filed on Mar. 21, 2012) under 35 U.S.C. §371, which claims the benefit of priority from Japanese Patent Application JP2011-069311, filed on Mar. 28, 2011, the entire contents of which are all hereby incorporated by reference in their entirety.

The disclosed exemplary embodiments relate to an image processing apparatus and image processing methods. More particularly, the disclosed exemplary embodiments relate to an image processing apparatus and an image processing method that process multiple images captured at varied positions in a depth direction to generate a left-eye image and a right-eye image for display of a stereoscopic image.

BACKGROUND ART

For example, PTL 1 describes a display of a stereoscopic image using binocular disparity, as illustrated in FIG. 8. FIG. 8 shows the relationship between positions where left and right images of objects (e.g., bodies) are displayed on a screen and positions where their stereoscopic images are reproduced on the screen in the display of stereoscopic images using the binocular disparity. For example, as for an object A whose left image La is shifted rightward for display on the screen, and whose right image Ra is shifted leftward for display on the screen, as shown in the drawing, its stereoscopic image is reproduced at a position on a near side with respect to a screen surface because left and right lines of sight intersect with each other on the near side with respect to the screen surface. Reference letter DPa denotes a horizontal disparity vector for the object A.

In addition, for example, as for an object B whose left image Lb and right image Rb are displayed at the same position on the screen, as shown in the drawing, its stereoscopic image is reproduced at a position on the screen surface because the left and right lines of sight intersect with each other on the screen surface. Furthermore, for example, as for an object C whose left image Lc is shifted leftward for display on the screen and whose right image Rc is shifted rightward for display on the screen, as shown in the drawing, its stereoscopic image is reproduced at a position on a far side with respect to the screen surface because the left and right lines of sight intersect with each other on the far side with respect to the screen surface. Reference letter DPc denotes a horizontal disparity vector for the object C.

For example, fluorescence microscopes have heretofore been used to capture images of living bodies, such as cells of human beings, at varied positions in a depth direction. The fluorescence microscopes can be used to capture an image at each depth-direction position without being blocked by bodies on the near side.

The fluorescence microscopes are microscopes in which fluorescent materials are attached to, for example, cells to be observed, the fluorescent materials are irradiated with laser light or the like to excite the fluorescent materials, and light emitted when the excited state is returned to a ground state is observed. For example, confocal microscopes and two-photon excitation microscopes are known as the fluorescence microscopes, although a detailed description of them is omitted here.

CITATION LIST

Patent Literature

PTL 1: Japanese Unexamined Patent Application Publication No. 2005-6114

SUMMARY OF INVENTION

Technical Problem

As described above, an addition and averaging process for each pixel has often been applied to multiple images captured at varied positions in the depth direction in the manner described above to generate one two-dimensional image for evaluation. FIG. 9 illustrates an exemplary application of the addition and averaging processes to twenty images to generate one two-dimensional image. Reference numerals "#1" to "#20" denote captured images and reference numeral "#1-#20" denotes the two-dimensional image that is generated. In this case, although the multiple images are captured at varied depth-direction positions and have three-dimensional information, the multiple images are degenerated and evaluated in a two-dimensional state and the three-dimensional information is not effectively used.

Furthermore, for example, a viewpoint is varied and moved, or hatching is performed, to highlight the hierarchical relationship in the related art in order to achieve stereoscopic effect. However, when the viewpoint is varied and moved, it is necessary to perform an operation reflecting a user's viewpoint and, thus, there is a disadvantage in that it is not possible to focus on the evaluation. In addition, the hatching for highlighting the hierarchical relationship is not sufficient to achieve the stereoscopic effect.

The disclosed exemplary embodiments may effectively leverage three-dimensional information associated with multiple images captured at varied depth-direction positions to allow an image having sufficient stereoscopic effect to be displayed.

Solution to Problem

Consistent with an exemplary embodiment, a computer-implemented method receives data associated with a plurality of images. The data specifies spatial positions of the images. The method includes determining displacements of the images in a first horizontal direction and a second horizontal direction, based on at least the spatial positions. The first horizontal direction is opposite to the second horizontal direction. The method includes generating, using a processor, first and second composites of the images, based on the determined displacements.

Consistent with a further exemplary embodiment, an information processing apparatus includes a receiving unit configured to receive data associated with a plurality of images. The data specifies spatial positions of the images. A determination unit is configured to determine displacements of the images in a first horizontal direction and a second horizontal direction, based on at least the spatial positions. The first horizontal direction is opposite to the second horizontal direction. A generating unit is configured to generate first and second composites of the images, based on the determined displacements.

Consistent with another exemplary embodiment, a tangible, non-transitory computer-readable medium stores instructions that, when executed by at least one processor, cause the processor to perform a method that includes receiving data associated with a plurality of images. The data specifies spatial positions of the images. The method includes determining displacements of the images in a first horizontal direction and a second horizontal direction, based on at least the spatial positions. The first horizontal direction is opposite to the second horizontal direction. The method includes generating, using a processor, first and second composites of the images, based on the determined displacements.

Advantageous Effects of invention

According to the disclosed exemplary embodiments, it is possible to effectively use three-dimensional information on multiple images captured at varied depth-direction positions to allow an image having sufficient stereoscopic effect to be displayed.

BRIEF DESCRIPTION OF DRAWINGS

FIG. 1 is a block diagram showing an example of the configuration of an image processing apparatus, in accordance with a first exemplary embodiment.

FIG. 2 is a diagram for describing a shifting process and an addition and averaging process of images in an image generating unit, consistent with disclosed exemplary embodiments.

FIG. 3 is a diagram showing an example of the horizontal size, the vertical size, and the depth distance in an image captured in a real space and the horizontal size, the vertical size, and the depth on 3D monitor display, consistent with disclosed exemplary embodiments.

FIG. 4 includes diagrams for describing the (linear and nonlinear) relationships between the depth-direction positions and the amounts of shift of images, consistent with disclosed exemplary embodiments.

FIG. 5 is a block diagram showing an example of the configuration of an image processing apparatus, in accordance with a second exemplary embodiment.

FIG. 6 includes diagrams for describing hidden surface elimination in an image generating unit, consistent with disclosed exemplary embodiments.

FIG. 7 is a diagram for describing the hidden surface elimination when only a nearest image has an effective area, consistent with disclosed exemplary embodiments.

FIG. 8 is a diagram for describing the relationship between positions where left and right images of objects are displayed on a screen and positions where their stereoscopic images are reproduced on the screen in display of stereoscopic images using binocular disparity.

FIG. 9 is a diagram for describing a process of performing the addition and averaging process for every pixel to multiple images captured at varied positions in a depth direction to generate one two-dimensional image in related art.

FIG. 10 is a diagram of an exemplary computer system, consistent with disclosed exemplary embodiments.

DESCRIPTION OF EMBODIMENTS

Below, exemplary embodiments of the present disclosure will be described. Here, the description will be performed in the order below:
1. First embodiment;
2. Second embodiment;
3. Modifications; and
4. Exemplary Computer Systems.
1. First Embodiment a. Configuration of Image Processing Apparatus FIG. 1 shows an example of the configuration of an image processing apparatus 100, in accordance with a first exemplary embodiment. This image processing apparatus 100 includes an image generating unit 101, an amount-of-shift determining unit 102, and an image-quality adjusting unit 103. This image processing apparatus 100 generates a left-eye image and a right-eye image for display of a stereoscopic image on the basis of multiple (e.g., N-number) images (e.g., fluorescence microscope images) captured at varied depth-direction positions and received at a corresponding receiving unit.

The image generating unit 101 performs a process of shifting multiple images (image data) in opposite directions depending on their depth-direction positions with respect to the image at a reference position to generate a group of left-eye images and a group of right-eye images to which disparity is given. Then, the image generating unit 101 performs an addition and averaging process for pixels for each pixel position to the respective image groups to generate a left-eye image SL and a right-eye image SR.

FIG. 2 shows an example of processing in the image generating unit 101, consistent with a disclosed embodiment. In this example of processing, eight images #1 to #8 captured at sequentially varied positions at regular intervals in the depth direction are processed, and the image #4 is used as the image at the reference position.

The image generating unit 101 performs the process of horizontally shifting the eight images depending on their depth-direction positions with respect to the image at the reference position (the image #4) to generate the multiple images composing the group of left-eye images. Specifically, the image generating unit 101 sequentially shifts the images (the images #3 to #1) on a near side in one horizontal direction depending on their depth-direction positions with respect to the image at the reference position and shifts the images (the images #5 to #8) on a far side in the other horizontal direction depending on their depth-direction positions with respect to the image at the reference position.

In this case, the image generating unit 101 sequentially shifts the images on the near side with respect to the image at the reference position (the image #4) in the horizontal direction by "+d". This causes the nearest image (the image #1) to be horizontally shifted with respect to the image at the reference position (the image #4) by "+3d'". In addition, in this case, the image generating unit 101 sequentially shifts the images on the far side with respect to the image at the reference position (the image #4) in the horizontal direction by "−d". This causes the furthest image (the image #8) to be horizontally shifted with respect to the image at the reference position (the image #4) by "−4d'". Here, "d" indicates an amount of shift determined by the amount-of-shift determining unit 102 on the basis of imaging conditions and display conditions in a manner described below.

Then, the image generating unit 101 performs the addition and averaging process for pixels (pixel data) for each pixel position to the multiple images (the images #1 to #8) composing the group of left-eye images subjected to the shifting process to generate the left-eye image SL (#1-#8). In this case, since the shifting process is performed, the number of pixels to be subjected to the addition and averaging process is any of one to eight depending on the pixel position.

In addition, the image generating unit 101 performs the process of horizontally shifting the eight images depending on their depth-direction positions with respect to the image at the reference position (the image #4) to generate the multiple images composing the group of right-eye images. Specifically, the image generating unit 101 sequentially shifts the images (the images #3 to #1) on the near side in the other horizontal direction depending on their depth-direction positions with respect to the image at the reference position and shifts the images (the images #5 to #8) on the far side in the one horizontal direction depending on their depth-direction positions with respect to the image at the reference position. This shifting process is a process in which symmetric shift is performed in a direction opposite to the one in the above case in which the multiple images composing the group of left-eye images are generated.

In this case, the image generating unit 101 sequentially shifts the images on the near side with respect to the image at the reference position (the image #4) in the horizontal direction by "−d'". This causes the nearest image (the image #1) to be horizontally shifted with respect to the image at the reference position (the image #4) by "−3d'". In addition, in this case, the image generating unit 101 sequentially shifts the images on the far side with respect to the image at the reference position (the image 44) in the horizontal direction by "+d'". This causes the furthest image (the image #8) to be horizontally shifted with respect to the image at the reference position (the image #4) by "+4d'".

Then, the image generating unit 101 performs the addition and averaging process for pixels (pixel data) for each pixel position to the multiple images (the images #1 to #8) composing the group of right-eye images subjected to the shifting process to generate the right-eye image SR (#1-#8). In this case, since the shifting process is performed, the number of pixels to be subjected to the addition and averaging process is any of one to eight depending on the pixel position.

Referring back to FIG. 1, the amount-of-shift determining unit 102 determines the amount of shift d on the basis of the imaging conditions and the display conditions. A method of determining the amount of shift d' in the amount-of-shift determining unit 102 will now be described in detail. Here, FIG. 3 shows an example of the horizontal size, the vertical size, and the depth distance in an image captured in a real space and the horizontal size, the vertical size, and the depth on 3D monitor display.

Provided that a dot pitch of the captured image is denoted by dps[m], the depth distance on the captured image is calculated by $Z_s[\text{pixel}] = Z_s[m]/dps$. In contrast, a depth Ld[m] reproduced in stereoscopic display is calculated by $Ld = L_s \cdot d_e/(d_e+d)$. Here, Ls denotes a viewing distance, de denotes a distance between left and right eyes, and d denotes a disparity (values on the near side are defined as positive values). In order to generate a stereoscopic image in accordance with the angle of view when the captured image is displayed, d is set to a value that is equal to Zs.

Here, provided that the disparity of a nearest target image is denoted by dmax and the disparity of a furthest target image is denoted by drain, the following Equation (1) is established:

[Math.1]                                                                                              (1)

$$Z_s[\text{pixel}] \cdot dp_d = L_{dmin} - L_{dmax}$$
$$= \frac{L_s \cdot d_e}{d_e + d_{min}} - \frac{L_s \cdot d_e}{d_e + d_{max}}$$
$$\approx \frac{L_s(d_{max} - d_{min})}{d_e + (d_{max} - d_{min})}$$
$$= \frac{L_s \Delta d}{d_e + \Delta d}$$

Here, dpd denotes the dot pitch on the display. A difference delta-d between dmax and dmin is represented by the following Equation (2) from Equation (1) and delta-d is represented by a pixel value according to Equation (3):

[Math.2]                                                                                              (2)

$$\Delta d = d_{max} - d_{min}$$
$$= \frac{Z_s[\text{pixel}] \cdot dp_d \cdot d_e}{L_s - Z_s[\text{pixel}] \cdot dp_d}$$

[Math.3]                                                                                              (3)

$$\Delta d[\text{pixel}] = \frac{\Delta d[m]}{dp_d}$$
$$= \frac{Z_s[\text{pixel}] \cdot d_e}{L_s - Z_s[\text{pixel}] \cdot dp_d}$$

The amount of shift d'[pixel] is represented by Equation (4) from Equation (3), where N denotes the number of captured images:

[Math.4]                                                                                              (4)

$$d' = \frac{\Delta d}{2(N-1)}$$

Here, Equation (5) results from substitution of Equation (3) into Equation (4) and addition of a scaling parameter s (that is normally equal to one):

[Math.5]                                                                                              (5)

$$s \cdot d' = s \cdot \frac{Z_s[\text{pixel}] \cdot d_e}{2(N-1)(L_s - Z_s[\text{pixel}] \cdot dp_d)}$$

Here, if all the parameters are not available, the parameters may be set in advance in the following manner:

(1) The display is a 46V-size panel of 1,920*1,080 and the dot pitch dpd is equal to 0.053 m.

(2) The viewing distance Ls is equal to 3H (three times the height of the display).

(3) The distance de between left and right eyes is equal to 6.5 cm.

In addition, d' may be appropriately multiplied by a constant. In this case, the scaling parameter s is adjusted. Furthermore, if delta-d exceeds a comfortable disparity range, d' is reduced to fit d' into the comfortable disparity range. In this case, the scaling parameter s is adjusted. The comfortable disparity range can be calculated from, for example, an assumed viewing distance or the screen size, although a detailed description of the above calculation is omitted herein. For example, the range in which comfortable viewing is realized with a 46V-size TV is a depth of 0.5 m (near side) to 1.5 m (far side) at a viewing distance of 1.7 m and is represented by −56 pixels (near side) to 55 pixels (far side) in replacement by the disparity.

In addition, the relationship between the depth-direction positions and the amounts of shift of images is linearly set, as shown in FIG. 4, in the above description. Accordingly, the process of sequentially shifting the eight images #1 to #8 captured at sequentially varied positions at regular intervals in the depth direction by the amount of shift d' is performed.

In this case, the disparity to be given to each image is calculated by equally dividing delta-d.

However, the relationship between the depth-direction positions and the amounts of shift of images may be non-linearly set, as shown in FIG. 4(b). In this case, the disparity to be given to each image is calculated by nonlinearly dividing delta-d. Since the relationship between the disparity and the depth is originally nonlinear, nonlinearly setting the relationship between the depth-direction positions and the amounts of shift of the images in the above manner allows the depth to be properly reproduced.

Referring back to FIG. 1, the image-quality adjusting unit 103 performs image quality adjustment, such as contrast adjustment, to the left-eye imago SL and the right-eye image SR generated in the image generating unit 101 to output a left-eye image SL' and a right-eye image SR' subjected to the image quality adjustment. In this case, for example, expanding a dynamic range of each image generated in the image generating unit 101 allows a dark image to be adjusted to a bright image to make the image easily viewable.

An operation of the image processing apparatus 100 shown in FIG. 1 will be described. Multiple images (image data) captured at varied depth-direction positions are supplied to the image generating unit 101. In addition, parameters indicating the imaging conditions, such as the dot pitch of the captured images and the depth distance of the captured images, and the display conditions, such as the viewing distance and the distance between left and right eyes, are supplied to the amount-of-shift determining unit 102. Then, in the amount-of-shift determining unit 102, the amount of shift d' is determined on the basis of, for example, Equation (5). This amount of shift d' is used in the process of shifting each image in the image generating unit 101.

In the image generating unit 101, the process of shifting the multiple (n-number) images in opposite directions depending on their depth-direction positions with respect to the image at the reference position is performed to generate the group of left-eye images and the group of right-eye images to which the disparity is given. Then, in the image generating unit 101, the addition and averaging process for pixels for each pixel position is performed to the respective image groups to generate the left-eye image SL and the right-eye image SR.

The left-eye image SL and the right-eye image SR generated in the image generating unit 101 are supplied to the image-quality adjusting unit 103. In the image-quality adjusting unit 103, the image quality adjustment, such as the contrast adjustment, is performed to the left-eye image SL and the right-eye image SR. For example, the dynamic range of each image generated in the image generating unit 101 is expanded to adjust a dark image to a bright image. Then, the left-eye image SL and the right-eye image SR' subjected to the image quality adjustment are output from the image-quality adjusting unit 103.

As described above, in the image processing apparatus 100 shown in FIG. 1, the left-eye image SL and the right-eye image SR to which the disparity is given are generated on the basis of multiple images captured at varied positions in the depth direction in the image generating unit 101. Specifically, in the image generating unit 101, the process of shifting the multiple images captured at varied positions in the depth direction in opposite directions depending on their depth-direction positions with respect to the image at the reference position is performed to generate the group of left-eye images and the group of right-eye images to which the disparity is given.

Then, in this image generating unit 101, the addition and averaging process for pixels for each pixel position is performed to the respective image groups to generate the left-eye image SL and the right-eye image SR. Accordingly, three-dimensional information on the multiple images captured at varied depth-direction positions is effectively used to generate the left-eye image SL and the right-eye image SR to which the disparity is given, thus allowing an image having sufficient stereoscopic effect to be displayed.

Furthermore, in the image processing apparatus 100 shown in FIG. 1, the left-eye image SL and the right-eye image SR generated in the image generating unit 101 are supplied to the image-quality adjusting unit 103 where the image quality adjustment, such as the contrast adjustment, is performed. Accordingly, for example, the dynamic range of each of the images SL and SR generated in the image generating unit 101 is expanded to allow a dark image to be adjusted to a bright image, thus making the stereoscopic image easily viewable.

2. Second Embodiment a. Example of Configuration of Image Processing Apparatus

FIG. 5 shows an example of the configuration of an image processing apparatus 100A, in accordance with a second exemplary embodiment. This image processing apparatus 100A includes an image generating unit 101A, the amount-of-shift determining unit 102, and the image-quality adjusting unit 103. The same reference numerals are used in FIG. 5 to identify the corresponding components in FIG. 1A detailed description of such components is appropriately omitted herein.

This image processing apparatus 100A generates a left-eye image and a right-eye image for display of a stereoscopic image on the basis of multiple images captured at varied depth-direction positions, as in the image processing apparatus 100 shown in FIG. 1. However, in this image processing apparatus 100A, since hidden surface elimination is performed in the image generating unit 101A, for example, the image at each depth-direction position, in which a body on the near side unexpectedly appears, is capable of being processed as the multiple (n-number) images, instead of the fluorescence microscope image.

The image generating unit 101A performs the process of shifting multiple (n-number) images in opposite directions depending on their depth-direction positions with respect to the image at the reference position to generate a group of left-eye images and a group of right-eye images to which the disparity is given. Then, the image generating unit 101A performs the addition and averaging process for pixels for each pixel position to the respective image groups to generate the left-eye image SL and the right-eye image SR. This processing is the same as the processing in the image generating unit 101 in the image processing apparatus 100 shown in FIG. 1.

The image generating unit 101A performs the hidden surface elimination on the basis of information on an effective area when the addition and averaging process is performed to each group of images, unlike the image generating unit 101. Here, the effective area indicates the area of a body actually existing at the position where each image is captured. For example, the information on the effective area may be manually provided by a user. Alternatively, for example, as for the information on the effective area, a portion having a higher spatial frequency or a portion having a lower spatial frequency may be extracted in, for example, the image generating unit 101A and the extracted portion may be used as the effective area. Incidentally, in FIG. 5, the information on the effective area is supplied from the outside of the image generating unit 101A.

The hidden surface elimination will now be described. FIG. 6(a) shows a casein which the hidden surface elimination is not performed, consistent with disclosed embodiments. In this case, the accumulated weight at each pixel position is equal to "1/the number of pixels". For example, the accumulated weight at pixel positions where eight images are overlapped with each other is equal to ⅛. In contrast, FIG. 6(b) shows a case in which the hidden surface elimination is performed, consistent with disclosed embodiments. In this case, the accumulated weight at each pixel position with no effective area is equal to "1/the number of pixels". However, the accumulated weight with in the effective area is equal to one, and the accumulated weight of an image on the far side at a portion corresponding to the hidden surface of the effective area of the image on the near side is equal to zero. Here, the hidden surface elimination is not limited to the method shown in FIG. 6(b).

FIG. 7 shows the hidden surface elimination in a case in which only the nearest image (the image #1) has the effective area, consistent with disclosed embodiments. Here, only the processing in the left-eye image SL is shown in FIG. 7 for simplicity of the drawing. In this case, at each pixel position within the effective area of the image #1, the pixel in the image #1 is directly used as the pixel in the left-eye image SL (#1-#8). In contrast, at each pixel position outside the effective area of the image #1, the pixels in each image are subjected to the addition and averaging process to use the result as the left-eye image SL (#1-#8).

The remaining configuration of the image processing apparatus 100A shown in FIG. 5 is the same as the configuration of the image processing apparatus 100 shown in FIG. 1, and the image processing apparatus 100A shown in FIG. 5 operates in the same manner as the image processing apparatus 100 shown in FIG. 1.

The image processing apparatus 100A shown in FIG. 5 has the same advantages as those of the image processing apparatus 100 shown in FIG. 1. Further more, in the image processing apparatus 100A shown in FIG. 5, in the image generating unit 101A, the hidden surface elimination is performed in the generation of the left-eye image SL and the right-eye image SR by performing the addition and averaging process for pixels for each pixel position to the group of left-eye images and the group of right-eye images (refer to FIG. 6(b)). Accordingly, for example, the image at each depth-direction position, in which a body on the near side unexpectedly appears, is capable of being processed as the multiple (n-number) images, instead of the fluorescence microscope image. In other words, the hidden surface elimination can be performed to generate the left-eye image SL and the right-eye image SR without using erroneous three-dimensional information on each image.

3. Modifications

The multiple images captured at varied depth-direction positions are images captured by a microscope, such as a fluorescence microscope, in the embodiments described above. However, the present technology is also applicable to cases in which other multiple images captured at varied depth-direction positions are processed to generate left-eye images and right-eye images for display of stereoscopic images.

4. Exemplary Computer Systems

In an embodiment, the functions of the above-described apparatus, and the various units associated with the apparatus, can be achieved using, for example, a computer system 1000 shown in FIG. 10. Further, in an additional embodiment, the functions of one or more of the structural elements, sections, and units may be achieved by controlling computer system 1000 using instructions stored on a tangible, non-transitory computer-readable storage medium. In such embodiments, examples of computer system 1000 include, but are not limited to a personal computer, a laptop computer, a tablet computer, a mobile phone, a smart phone, a personal digital assistance (PDA), mobile information terminal, and/or a mobile game console.

As shown in FIG. 10, computer system 1000 includes a central processing unit. (CPU) 1002, a host bus 1008, a bridge 1010, and a tangible computer-readable storage media, examples of which include a read only memory (ROM) 1004, and a random access memory (RAM) 1006. Furthermore, computer system 1000 includes an external bus 1012, an interface 1014, an input unit 1016, an output unit 1018, a storage unit 1020, a drive 1022, a connection port 1024, and a communication unit 1026.

CPU 1002 may function as an arithmetic processing unit or a control unit, for example, and controls the entire operation or a part of the operation of each structural element based on various instructions stored within ROM 1004, RAM 1006, storage unit 1020, or a removable recording medium 1028. ROM 1004 may be configured to store, for example, a instructions to be loaded on CPU 1002 or data or the like used in an arithmetic operation. RAM 1006 temporarily or permanently stores, for example, instructions to be loaded on CPU 1002 or various parameters or the like arbitrarily changed in execution of a program.

These structural elements are connected each other by, for example, host bus 1008 capable of performing high-speed data transmission. Host bus 1008 is connected through bridge 1010 to external bus 1012 whose data transmission speed is relatively low, for example. Furthermore, input unit 1016 may include, for example, a mouse, a keyboard, a touch panel, a button, a switch, or a lever. Also, input unit 1016 may be a remote control that can transmit a control signal by using an infrared ray or other radio waves.

Output unit 1018 may be a display device that includes, but is not limited to, a cathode ray tube (CRT), a liquid crystal display (LCD), a plasma display panel (PDP), an electro-luminescence display (ELD), and audio output device (e.g., a speaker or headphones), a printer, a mobile phone, and/or a facsimile, that may provide a visual or auditory notification to a user of acquired information.

Storage unit 1020 is an example of a tangible, non-transitory computer-readable storage medium or device for storing various data. Storage unit 1020 may include, for example, a magnetic storage device such as a hard disk drive (HDD), a semiconductor storage device, an optical storage device, a magneto-optical storage device.

Drive 1022 is a device that reads information recorded on removable recording medium 1028 such as a magnetic disk, an optical disk, a magneto-optical disk, or a semiconductor memory, or writes information in removable recording medium 1028. Removal recording medium 1028 is another example of a tangible, non-transitory storage medium, for example, a DVD medium, a Blu-ray medium, an HD-DVD medium, various types of semiconductor storage media, or the like. Removable recording medium 1028 may be, for example, an electronic device or an IC card on which a non-contact IC chip is mounted. The IC is an abbreviation for Integrated Circuit.

Connection port 1024 may be a port that includes, but is not limited to, a USB port, an IEEE1394 port, a SCSI, an RS-232C port, or a port for connecting an externally connected device 1030, such as an optical audio terminal.

Externally connected device 1030 may be, for example, a printer, a mobile music player, a digital camera, a digital video camera, or an IC recorder.

Communication unit 1026 is a communication device to be connected to a network 1032, and is, for example, a communication card for a wired or wireless LAN, Bluetooth, or wireless USB, an optical communication router, an ADSL router, or a modem for various types of communication. Network 1032 connected to communication unit 1026 is configured from a wire-connected or wirelessly connected network, and is the Internet, a home-use LAN, infrared communication, visible light communication, broadcasting, or satellite communication, for example.

It should be understood by those skilled in the art that various modifications, combinations, sub-combinations and alterations may occur depending on design requirements and other factors insofar as they are within the scope of the appended claims or the equivalents thereof.

It should be noted that the present disclosure can also take the following configurations.

(1)

An image processing apparatus comprising:

an image generating unit that processes a plurality of images captured at varied positions in a depth direction to generate a left-eye image and a right-eye image, wherein the image generating unit performs a process of shifting the plurality of images in opposite directions depending on their depth-direction positions with respect to the image at a reference position to generate a group of left-eye images and a group of right-eye images to which disparity is given and performs an addition and averaging process for pixels for each pixel position to the respective image groups to generate the left-eye image and the right-eye image.

(2)

The image processing apparatus according to (1), wherein the image generating unit performs the process of sequentially shifting the images on a near side of the reference position, among the plurality of images, in one horizontal direction depending on their depth-direction positions with respect to the image at the reference position and shifting the images on a far side of the reference position, among the plurality of images, in the other horizontal direction depending on their depth-direction positions with respect to the image at the reference position to generate the plurality of images composing the group of left-eye images and performs the addition and averaging process for pixels for each pixel position to the plurality of images to generate the left-eye image, and wherein the image generating unit performs the process of sequentially shifting the images on the near side of the reference position, among the plurality of images, in the other horizontal direction depending on their depth-direction positions with respect to the image at the reference position and shifting the images on the far side of the reference position, among the plurality of images, in the one horizontal direction depending on their depth-direction positions with respect to the image at the reference position to generate the plurality of images composing the group of right-eye images and performs the addition and averaging process for pixels for each pixel position to the plurality of images to generate the right-eye image.

(3)

The image processing apparatus according to (I), wherein a relationship between the depth-direction positions and amounts of shift of the images is linearly set.

(4)

The image processing apparatus according to (1), wherein the image generating unit performs hidden surface elimination when the addition and averaging process is performed to the respective groups of images.

(5)

The image processing apparatus according to (1), further comprising:

an image-quality adjusting unit that performs at least contrast adjustment to the respective images generated in the image generating unit.

(6)

The image processing apparatus according to (1), wherein the plurality of images captured at varied positions in the depth direction is fluorescence microscope images.

(7)

An image processing method comprising:

a first step of performing a process of shifting a plurality of images captured at varied positions in a depth direction in opposite directions depending on their depth-direction positions with respect to the image at a reference position to generate a group of left-eye images and a group of right-eye images to which disparity is given; and a second step of performing an addition and averaging process for pixels for each pixel position to the respective image groups generated in the first step to generate the left-eye image and the right-eye image.

REFERENCE SIGNS LIST

100,100A A image processing apparatus
101,101A image generating unit
102 amount-of-shift determining unit
103 image-quality adjusting unit

The invention claimed is:

1. A computer-implemented method for generating an image, comprising:

receiving data associated with a plurality of two-dimensional images from which a respective composite image is generated for each human eye, the data specifying spatial positions of all the images;

identifying, based on the received data, one image of the plurality of two-dimensional images as a reference image, the reference image being associated with a corresponding reference spatial position;

determining displacements, based on at least the spatial positions, in a first horizontal direction or in a second horizontal direction, of each image of the plurality of two-dimensional images from the reference image, the first horizontal direction being opposite to the second horizontal direction;

generating, using at least one processor, a first composite image associated with one eye of a user by shifting, based on the determined displacements, one or more images of the plurality of two-dimensional images in the first horizontal direction and one or more images of the plurality of two-dimensional images in the second horizontal direction, wherein the one or more images that are shifted in the first horizontal direction are different than the one or more images shifted in the second horizontal direction for generating the first composite image;

generating, using at least one processor, a second composite image associated with another eye of the user by shifting, based on the determined displacements, one or more images of the plurality of two-dimensional images in the first horizontal direction and one or more images of the plurality of two-dimensional images in the second horizontal direction, wherein the one or more images that are shifted in the first horizontal direction are different than the one or more images shifted in the second horizontal direction for generating the second composite image; and creating, using at least one processor, a stereoscopic image for perception of the user, based on a projection of the first composite image associated with the one eye, and a projection of the second composite image associated with the another eye.

2. The method of claim 1, wherein the stereoscopic image is perceptible via a fluorescence microscope.

3. The method of claim 1, wherein the determining further comprises:

determining distances separating corresponding ones of the plurality of two-dimensional images from the reference image in a vertical direction; and computing, for each of the plurality of two-dimensional images, magnitudes of the displacements based on at least the corresponding values of the separation distances.

4. The method of claim 3, wherein:

the determining further comprises obtaining at least one of an imaging condition or a display condition; and the computing comprises computing the magnitudes of the displacements for each of the plurality of two-dimensional images based on the obtained information.

5. The method of claim 3, wherein the magnitude of the displacement for at least one image of the plurality of two-dimensional images is directly proportional to the corresponding value of the separation distance.

6. The method of claim 3, wherein the magnitude of the displacement for at least one image of the plurality of two-dimensional images is associated with the corresponding value of the separation distance in accordance with a non-linear relationship.

7. The method of claim 3, wherein the determining further comprises:

determining, for at least one image of the plurality of two-dimensional images, whether the computed magnitude of the displacement exceeds a threshold value; and calculating a modified magnitude of the displacement, when the magnitude of the displacement exceeds the threshold value, the modified magnitude being smaller than the computed magnitude.

8. The method of claim 1, wherein the generating is further configured to shift, based on the determined displacement, an upper portion of the plurality of two-dimensional images in the first horizontal direction and a lower portion of the plurality of two-dimensional images in the second horizontal direction.

9. The method of claim 3, wherein the determining further comprises determining a first set of displacements for the plurality of two-dimensional images and a second set of displacements for the plurality of two-dimensional images, the first set of displacements corresponding to the first composite image, the second set of displacements corresponding to the second composite image.

10. The method of claim 9, the first and second sets of displacements are associated with corresponding magnitudes of the displacements.

11. The method of claim 9, wherein determining the first set of displacements comprises:

determining whether a corresponding one image of the plurality of two-dimensional images is disposed above the reference image in the vertical direction;

associating the first displacement of the corresponding image with the first horizontal direction, when the corresponding image is disposed above the reference image in the vertical direction; and associating the first displacement of the corresponding image with the second horizontal direction, when the corresponding image is disposed above the reference image in the vertical direction.

12. The method of claim 9, wherein determining the second set of displacements comprises:

determining whether one corresponding image of the plurality of two-dimensional images is disposed above the reference image in the vertical direction;

associating the second displacement of the corresponding image with the first horizontal direction, when the corresponding image is disposed above the reference image in the vertical direction; and associating the second displacement of the corresponding image with the second horizontal direction, when the corresponding image is disposed above the reference image in the vertical direction.

13. The method of claim 9, wherein the generating further comprises:

generating the first composite image based on the determined first set of displacements for the plurality of two-dimensional images; and generating the second composite image based on the determined first set of displacements for the plurality of two-dimensional images.

14. The method of claim 1, wherein the generating further comprises:

applying an addition and averaging process to values of pixels in corresponding ones of the displaced images; and generating the first and second composite images, based on the processed pixel values.

15. The method of claim 14, wherein the generating further comprises obtaining information identifying an effective area within at least one image of the plurality of two-dimensional images, the effective area being indicative of a presence of a body within the at least one image of the plurality of two-dimensional images.

16. The method of claim 15, wherein the applying further comprises:

applying the addition and averaging process to values of one or more pixels disposed outside of the effective area; and maintaining, within the first and second composite images, values of at least one pixel disposed within the effective area.

17. An information processing apparatus, comprising:

a receiving unit configured to receive data associated with a plurality of two-dimensional images from which a respective composite image is generated for each human eye, the data specifying spatial positions of all the images;

a determination unit configured to identify, based on the received data, one image of the plurality of two-dimensional images as a reference image, the reference image being associated with a corresponding reference spatial position, determine displacements, based on at least the spatial positions, in a first horizontal direction or in a second horizontal direction, of each image of the plurality of two-dimensional images from the reference image, the first horizontal direction being opposite to the second horizontal direction, and a generating unit configured to generate a first composite image associated with one eye of a user by shifting, based on the determined displacements, one or more images of the plurality of two-dimensional images in the first horizontal direction and one or more images of the plurality of two-dimensional images in the second horizontal direction, wherein the one or more images that are shifted in the first horizontal direction are different than the one or more images shifted in the second horizontal direction for generating the first composite image, generate a second composite image associated with another eye of the user by shifting, based on the determined displacements, one or more images of the plurality of two-dimensional images in the first horizontal direction and one or more images of the plurality of two-dimensional images in the second horizontal direction, wherein the one or more images that are shifted in the first horizontal direction are different than the one or more images shifted in the second horizontal direction for generating the second composite image, and generate a stereoscopic image for perception of the user, based on a projection of the first composite image associated with the one eye, and a projection of the second composite image associated with the another eye, wherein the receiving unit, the determination unit, and the generating unit are each implemented via at least one processor.

18. A tangible, non-transitory computer-readable medium storing instructions that, when executed by at least one processor, cause the at least one processor to perform a method, comprising:

receiving data associated with a plurality of two-dimensional images from which a respective composite image is generated for each human eye, the data specifying spatial positions of all the images;

identifying, based on the received data, one image of the plurality of two-dimensional images as a reference image, the reference image being associated with a corresponding reference spatial position;

determining displacements, based on at least the spatial positions, in a first horizontal direction or in a second horizontal direction of each image of the plurality of two-dimensional images from the reference image, in a first horizontal direction and a second horizontal direction the first horizontal direction being opposite to the second horizontal direction;

generating a first composite image associated with one eye of a user by shifting, based on the determined displacements, one or more images of the plurality of two-dimensional images in the first horizontal direction and one or more images of the plurality of two-dimensional images in the second horizontal direction, wherein the one or more images that are shifted in the first horizontal direction are different than the one or more images shifted in the second horizontal direction for generating the first composite image, generate a second composite image associated with another eye of the user by shifting, based on the determined displacements, one or more images of the plurality of two-dimensional images in the first horizontal direction and one or more images of the plurality of two-dimensional images in the second horizontal direction, wherein the one or more images that are shifted in the first horizontal direction are different than the one or more images shifted in the second horizontal direction for generating the second composite image, and generate a stereoscopic image for perception of the user, based on a projection of the first composite image associated with the one eye, and a projection of the second composite image associated with the another eye.

19. The method of claim 15, wherein the information identifying the effective area indicates a portion of the at least one image having a higher spatial frequency.

20. The method of claim 15, wherein the information identifying the effective area indicates a portion of the at least one image having a lower spatial frequency.

* * * * *